United States Patent [19]

Ferguson

[11] 4,150,341
[45] Apr. 17, 1979

[54] HIGH INPUT POWER LASER DEVICE

[75] Inventor: Gerald D. Ferguson, Yardley, Pa.

[73] Assignee: The United States of America as represented by the Secretary of the Navy, Washington, D.C.

[21] Appl. No.: 754,916

[22] Filed: Dec. 28, 1976

[51] Int. Cl.² .............................................. H01S 3/02
[52] U.S. Cl. ........................... 331/94.5 C; 331/94.5 D
[58] Field of Search ...................... 331/94.5 E, 94.5 F, 331/94.5 P, 94.5 D, 94.5 C; 350/96 GN; 330/4.3 (U.S. only)

[56] References Cited
U.S. PATENT DOCUMENTS

| 3,548,336 | 12/1970 | Anderson et al. | 331/94.5 P |
| 3,679,996 | 7/1972 | Almasi et al. | 330/4.3 |
| 3,849,738 | 11/1974 | Hakki | 350/164 |
| 4,045,120 | 8/1977 | de Corlieu et al. | 350/96 C |

Primary Examiner—William L. Sikes
Attorney, Agent, or Firm—R. S. Sciascia; Henry Hansen; Stanton D. Weinstein

[57] ABSTRACT

A laser device for generating high input power by minimization of surface reflection losses between adjacent elements of the device. A laser medium having an index of refraction substantially greater than 1.5 is fluid cooled in a sealed tube by an optically clear cooling medium having a substantially lower refractive index. The indices of the laser and cooling mediums are matched to each other by thin film coatings of index matching material attached to the laser medium, each coating having a thickness of one quarter of the lasing wavelength.

6 Claims, 2 Drawing Figures

HIGH INPUT POWER LASER DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to laser apparatus and particularly to a matched index laser device for generating high input powers and which minimizes surface reflection losses between adjacent elements of the device.

Laser devices which emit high energy pulses are well-known in the art. Optical ranging systems employing laser techniques within a marine environment provide useful applications for a laser device having high pulse repetition rates and high average power along with improved efficiency and reduced beam divergence. The laser output is typically only a small percentage of the input energy, a large percentage of the energy ending up as heat in the laser medium. In high input power laser devices, one or more surfaces of the active laser medium is cooled in order to extract the excess heat. Because of the limited thermal conductivity of the laser medium, the excess heat is more rapidly removed from near the surface than from the interior. Various means and methods exist for the cooling of laser apparatus designed to operate at high pulse repetition rates and high input powers. In most cases, there are but two major areas of potential energy loss within a laser device. One of the high energy loss areas which has been addressed by corrective systems of the prior art involves the thermal lensing and distortions generated within a laser medium due to the relatively high heat buildup therein. The other of the high energy loss areas involves surface reflector or Fresnel losses caused by the differing indices of refraction between adjacent element interfaces within the laser device. The thermal lensing and distortion situation is remedied in one prior art system wherein the major surfaces of laser elements are placed in physical contact with a flowing coolant having an index of refraction near that of the laser elements. For example, the laser device exhibited a refractive index of 1.5 and was matched to a cooling liquid in the nature of dimethyl sulfoxide having a refractive index of 1.48 and which performed adequately as the cooling medium. This system also has the added benefit of eliminating Fresnel losses by index matching of the adjacent element interfaces. A problem arises, however, when a laser medium is utilized having an index of refraction substantially greater than 1.5 such as either ruby at 1.76 or Neodymium:YAG at 1.82. The foregoing relatively high refractive indices would therefore require a matched index cooling medium having a similarly high index of refraction and which would, concurrently, be both optically clear and thermally conductive. The scarcity of such high refractive index cooling mediums inhibits the efficient cooling of laser mediums having high refractive indices by means of index matching techniques due to the more common coolants having indices of 1.5 and lower.

SUMMARY OF THE INVENTION

Accordingly, it is an object of the present invention to provide a laser device having a laser medium with a refractive index substantially greater than 1.5 and which is efficiently cooled in an index matched system having a coolant with a refractive index of substantially less than 1.5. Another object of the present invention is to provide a high input power laser device which minimizes Fresnel losses and provides high input powers. A further object of the present invention is to provide an index matched laser device having high pulse repetition rates, improved efficiency and reduced beam divergence.

Briefly, these and other objects are accomplished by an index matched laser device which generates high input powers by minimization of Fresnel losses between adjacent element surfaces of the device. A laser medium such as Neodymium (Nd):YAG having an index of refraction substantially greater than 1.5 is fluid cooled in a sealed tube by an optically clear cooling medium such as silicone oil having a substantially lower refractive index of 1.43. The coolant is matched to the laser medium index by a dielectric thin film matching medium such as aluminum oxide having a refractive index of $1.65(\lambda=1.064\mu)$ and which is secured to opposing ends of the laser medium normal to the optical path thereof and with a thickness one quarter of the lasing wavelength. The interpositioning of the matching medium between the laser medium and the coolant provides a matched index laser device which greatly minimizes Fresnel losses and increases laser efficiency.

For a better understanding of these and other aspects of the invention, reference may be made to the following detailed description taken in conjunction with the accompanying drawings.

DESCRIPTION OF THE PREFERRED EMBODIMENT

Figure 1:
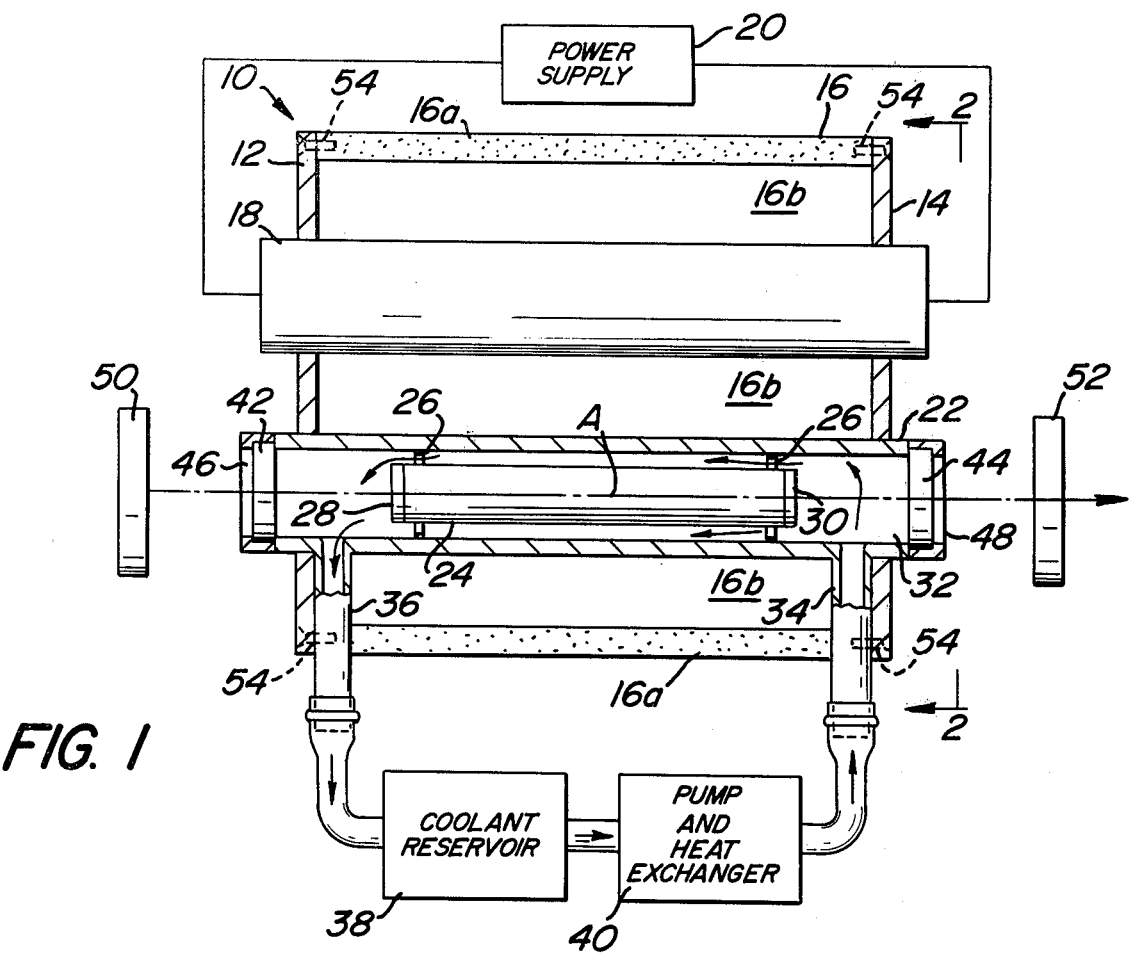
FIG. 1 is a top elevation view of a pump cavity and cooling apparatus for a matched index laser device made according to the present invention.
Figure 2:
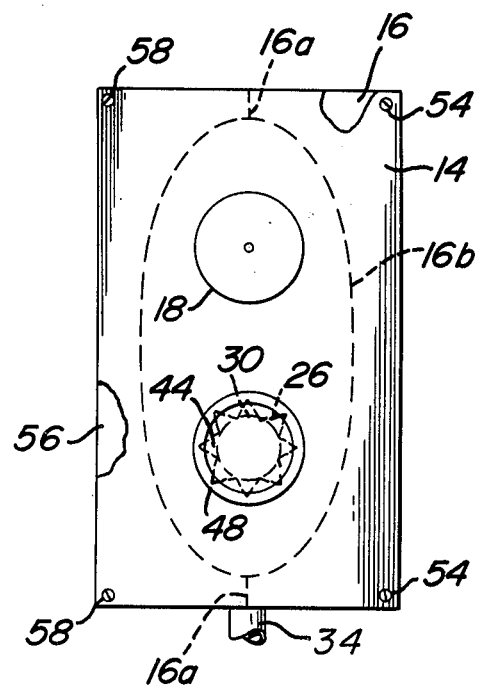
FIG. 2 is an end view taken along the lines 2—2 noted in FIG. 1 of one of the end plates forming a portion of the pump cavity.

Referring now to FIG. 1 there is shown a top elevation view of a laser pump cavity 10 made according to the present invention and which has the top portion thereof removed for a clearer identification of the structural elements supported therein. The cavity 10 is formed by the parallel positioning of rectangular end plates 12 and 14 which oppose one another at opposite ends of a cavity bottom block 16. The bottom block 16 as well as an identically shaped top block shown in further detail in FIG. 2 are machined from a single homogeneous piece of metal such as steel to form a hollow oval shaped chamber which is high polished internally for optical efficiency. FIG. 1 delineates machined and polished surfaces of the bottom block 16 by noting the stippled areas 16a at the perimeter of the bottom block normal to the end plates 12, 14 and the polished surfaces 16b of the bottom block 16 intermediate the dull machined surfaces 16a. A conventional flashlamp 18 is supported near the opposing ends thereof within and by the respective end plates 12 and 14 and is connected to a power supply 20. Also supported within the cavity 10 and by the end plates 12 and 14 is a cooling tube 22 such as made from clear glass and which has centrally supported therein the laser medium 24 shaped in the form of a cylindrical rod. The laser medium 24 is positioned relative to the tube 22 by means of starshaped support springs 26 interposed between the outer circumference of the laser medium 24 and the inner surface of the cooling tube 22. A pair of dielectric thin film matching mediums 28 and 30 are secured adjacent opposing ends of the laser medium 24. The matching mediums 28 and 30 each have a coating thickness one quarter of the lasing wavelength of the device. A cooling medium 32 flows about the laser medium 24 and matching mediums 28 and 30 and in intimate contact therewith as denoted by the flow direction arrows shown in FIG. 1. The cooling tube 22 is provided with an inlet 34 and an outlet 36 to permit the ingress and egress of the cooling medium 32 as it is drawn from a coolant reservoir 38 and pumped by a pump and heat exchanger 40. Each of the opposing ends of the cooling tube 22 are capped by optically clear and circular quartz windows 42 and 44 which are attached and sealed to the tube 22, in any conventional manner such as by epoxy, by respective cup-shaped circular sealing plates 36 and 38. Each of the plates 36, 38 have an opening formed therein and concentric with the respective quartz windows 42, 44 for permitting the passage of a coherent light beam along an optical axis A traversing the longitudinal axis of the laser medium 24 within a resonant chamber formed between a fully reflective mirror 50 and a partially reflective mirror 52 placed normal to the optical axis A and external to the pump cavity 10.

Referring now to FIG. 2 there is shown a side elevation view of the cavity end plate 14. The other end plate 12 is similarly shaped. More clearly shown is the positioning of the flashlamp 18 and sealing plate 48 relative to the oval cylindrical chamber denoted by the dashed lines within the pump cavity. The end plate 14 is secured to the cavity bottom block 16 by a pair of screws 54. Similarly, an opposing and identically shaped cavity top block 56 is secured to the top portion of the end plate 14 by a pair of screws 58. The blocks 16 and 56 mate in registration with one another about the machined surfaces 16a with the interior hollow oval surface 16b being highly polished to provide maximum bounce and reflection of light energy from the flashlamp 18 into the laser medium 22 whose positioning is denoted relative to the quartz window 44 and sealing ring 48 by the matching medium 30.

Referring again to FIG. 1 in conjunction with FIG. 2, the operation of the invention will now be disclosed. The laser medium 24, which is shaped in the form of a cylindrical rod, has an index of refraction greater than 1.5 such as provided by a Nd:YAG material having a refractive index of 1.82. The cooling medium 32 is introduced to the cooling tube by the reservoir 38 and pump and heat exchanger 40 through tube inlet 34 to come in intimate contact with and flow about the medium 24 and denoted by the directional arrows. The cooling process is continuous with the cooling medium 32 exiting the tube 22 through the outlet 36 and being recycled through the reservoir and pump. The coherent light beam passes along the longitudinal length of the laser medium 24 about the optical axis A and passes through the opposing ends of the medium 24 which are each coated by any conventional technique such as by vacuum deposit evaporation, with a quarter wavelength thick coating of the thin film matching mediums 28 and 30.

The opposing dielectric thin film matching mediums 28, 30 minimize or eliminate surface reflection losses between transparent media such as the laser medium 24 and the cooling medium 32. Consider the case wherein there are two transparent media of indices $n_1$ and $n_2$ having interposed between themselves a dielectric film of index $n_f$ and thickness d. The reflection coefficient, for normal incidence $r_{12}$ from which the surface reflectance R (Reflectance $R = |r_{12}|^2$) is derived is given by the equation:

$$r_{12} = \frac{(n_1 - n_2)n_f \cos Bd - i(n_1 n_2 - n_f^2) \sin Bd}{(n_1 + n_2)n_f \cos Bd - i(n_1 n_2 + n_f^2) \sin Bd} \quad (1)$$

The product Bd represents the wave vector amplitude within the dielectric film. For $r_{12}$ to be equal to zero in equation (1), Bd must be equal to $\pi/2$ or multiples thereof and $$n_f^2 = n_1 n_2 \quad (2)$$

Therefore there are no surface losses due to reflectance if the film has an optical thickness of one-quarter wavelength ($Bd = \pi/2$) and the refractive $n_f$ index of the film is equal to $$n_f = \sqrt{n_1 n_2} \quad (3)$$

The coherent light beam travels along the optical axis A central to the laser medium and passes through the opposing matching mediums 28, 30, quartz windows 42, 44, and sealing plates 46, 48 to resonate within the chamber in the classical laser resonating technique and to ultimately produce a coherent light beam output from the partially reflective mirror 52.

The laser device of the present invention is capable of producing relatively high input powers by minimizing the Fresnel losses between adjacent reflector surfaces of the laser medium 24, the matching mediums 28, 30 and the cooling medium 32. The Fresnel losses are minimized by index matching the material compositions of the before noted three laser matching and cooling mediums. The first step in the process of index matching begins with the selection of the material for the laser medium 24. In most marine applications involving the blue-green color spectra, a laser medium of Nd:YAG material is chosen and then frequency doubled for operation in that spectra. Nd:YAG has an index of refraction of 1.82. A coolant for the Nd:YAG is now selected on the basis of optical clarity at the lasing wavelength ($\lambda = 1.0641$ for Nd:YAG) and thermal conductivity. As earlier noted, the most commonly available coolants exhibit indices of refraction below 1.5 and, in this example, an optically clear silicone fluid coolant is selected which is thermally conductive and which has a refractive index of 1.43. One such silicone fluid is Dow Corning 510 Fluid having a viscosity of 50 centistokes as manufactured by Dow Corning Corporation, Midland, Michigan. The relatively low refractive index of the silicon fluid cooling medium is matched to the relatively high refractive index of the Nd:YAG laser medium by the interposition of the matching mediums 28, 30 which may be made, for example, from aluminum oxide having an index of refraction of 1.65 ($\lambda = 1.0641\mu$). The respective refractive indices of each of the adjacent mediums may be matched to one another to eliminate reflector losses by the relationship noted in equation (3) wherein the refractive index of the first medium $n_1$ is matched to the index $n_2$ of the second medium to produce the refractive index $n_f$ required for the film medium. As an alternative to the use of aluminum oxide as the matching medium, a thin film coating of cerium fluoride having a refractive index of 1.65 may be employed.

In the case of a ruby laser medium having a refractive index of 1.76 being cooled with the silicone fluid 510 noted hereinbefore, a dielectric thin film matching medium of silicon dioxide having a refractive index of substantially 1.58 at the lasing wavelength may be utilized to eliminate surface reflector losses.

Having satisfied the relationship of equation (3), the refractive indices of the laser and cooling mediums are essentially matched by the introduction of a thin film matching medium thereby providing a laser device which is indexed matched throughout and which therefore has minimum Fresnel losses between adjacent elements.

Thus it may be seen that there has been provided a novel laser device which has been index matched to minimize Fresnel losses and to increase efficiency and input power.

Obviously many modifications and variations of the invention are possible in light of the above teaching. It is therefore to be understood that within the scope of the appended claims the invention may be practiced otherwise than as specifically described.

What is claimed is:

1. A laser device for producing a laser beam along an optical axis, in combination, comprising:
   a pump cavity;
   a flash lamp formed to be supported within said cavity;
   a laser rod operatively mounted along the optical axis in said pump cavity adjacent said flash lamp for receiving light emissions therefrom, said laser rod having a first predetermined index of refraction;
   said laser rod including opposing end surfaces having coatings attached thereto; and
   a transparent tube enclosing said laser rod and containing a coolant about said laser rod in intimate contact therewith, said coolant having a second predetermined index of refraction lower than said first index of refraction;
   said coatings having a third predetermined index of refraction intermediate said first and second refractive indices for matching the refractive indices of said laser rod to said coolant and for increasing the power of the laser device.

2. A laser device according to claim 1 wherein said laser rod is cylindrical.

3. A laser device according to claim 1 wherein said coatings comprise a pair of dielectric thin films, each of said films having a thickness of one quarter of the lasing wavelength for minimizing surface reflection losses within the device.

4. A laser device according to claim 1 wherein said laser rod comprises Nd:YAG material having a refractive index of substantially 1.82, said coolant comprises silicone fluid having a refractive index of substantially 1.43 and said coatings comprise aluminum oxide having a refractive index of substantially 1.65 at the lasing wavelength.

5. A laser device according to claim 1 wherein said laser rod comprises ruby material having a refractive index of substantially 1.76, said coolant comprises silicone fluid having a refractive index of substantially 1.43 and said coatings comprise silicon dioxide having a refractive index of substantially 1.58 at the lasing wavelength.

6. A laser device according to claim 1 wherein said laser rod comprises Nd:YAG material having a refractive index of substantially 1.82, said coolant comprises silicone fluid having a refractive index of substantially 1.43 and said coatings comprise cerium fluoride having a refractive index of substantially 1.65 at the lasing wavelength.

* * * * *